US009983965B1

(12) United States Patent
Gauf et al.

(10) Patent No.: US 9,983,965 B1
(45) Date of Patent: May 29, 2018

(54) METHOD AND SYSTEM FOR IMPLEMENTING VIRTUAL USERS FOR AUTOMATED TEST AND RETEST PROCEDURES

(71) Applicant: Innovative Defense Technologies, LLC, Arlington, VA (US)

(72) Inventors: Bernard Gauf, Vienna, VA (US); Scott Bindas, Rochester, MA (US); William Richard Stubbs, Woodstock, CT (US)

(73) Assignee: INNOVATIVE DEFENSE TECHNOLOGIES, LLC, Arlington, VA (US)

( * ) Notice: Subject to any disclaimer, the term of this patent is extended or adjusted under 35 U.S.C. 154(b) by 209 days.

(21) Appl. No.: 14/568,561

(22) Filed: Dec. 12, 2014

Related U.S. Application Data

(60) Provisional application No. 61/915,712, filed on Dec. 13, 2013.

(51) Int. Cl.
  *G06F 11/00*  (2006.01)
  *G06F 11/263* (2006.01)
  *G06F 11/36*  (2006.01)

(52) U.S. Cl.
  CPC ........ *G06F 11/263* (2013.01); *G06F 11/3664* (2013.01); *G06F 11/3676* (2013.01); *G06F 11/3684* (2013.01)

(58) Field of Classification Search
  CPC ...... G06F 11/263; G06F 11/26; G06F 11/273; G06F 11/3664; G06F 11/3668;
  (Continued)

(56) References Cited

U.S. PATENT DOCUMENTS 5,640,537 A * 6/1997 Jessen ................ G06F 11/3664
                                                    703/23
6,772,107 B1 * 8/2004 La Cascia, Jr. ..... G06F 11/3414
                                                    703/21
(Continued)

FOREIGN PATENT DOCUMENTS

CN          1741464 A  *  3/2006

OTHER PUBLICATIONS

Wong, SS. & R.M. Burton (2000), "Virtual Teams: What are their Characteristics, and Impact on Team Performance?" Computational & Mathematical Organization Theory, vol. 6 Issue 4, pp. 339-360.*
(Continued)

*Primary Examiner* — Bryce P Bonzo
*Assistant Examiner* — Anthony J Amoroso
(74) *Attorney, Agent, or Firm* — Hunton Andrews Kurth LLP

(57) ABSTRACT

According to an embodiment of the present invention, a computer implemented method and system for automated test and retesting using an interactive interface provided by a computer processor comprising: an input configured to receive a set of rules for a virtual user, the set of rules comprising a plurality of conditional statements for the virtual user; a memory component configured to store the set of rules; and a rules engine, comprising at least one processor, configured to generate a plurality of test flows based on the set of rules wherein the test flow tool provides modeling capability through an interface comprising a canvas configured to manage one or more rules and a palette that contains a collection of modeling components; and further configured to automatically execute the plurality of test flows on a system under test.

18 Claims, 6 Drawing Sheets

(58) Field of Classification Search
CPC ............. G06F 11/3676; G06F 11/3688; G06F 11/3692; G06F 8/34; G06F 8/35; G06F 8/38; G06F 11/3684
See application file for complete search history.

(56) References Cited

U.S. PATENT DOCUMENTS

| | | | |
|---|---|---|---|
| 8,990,629 B2* | 3/2015 | Salame | G06F 11/079 714/26 |
| 2003/0074606 A1* | 4/2003 | Boker | G06F 11/3495 714/42 |
| 2004/0153837 A1* | 8/2004 | Preston | G06F 11/3688 714/39 |
| 2009/0235172 A1* | 9/2009 | Gandhi | G06F 11/3688 715/733 |
| 2009/0249121 A1* | 10/2009 | Kube | G06F 11/3684 714/32 |
| 2009/0276771 A1* | 11/2009 | Nickolov | G06F 9/4856 717/177 |
| 2009/0300059 A1* | 12/2009 | Castelli | A63F 13/12 |

OTHER PUBLICATIONS

Wong, SS. & R.M. Burton (2000), "Virtual Teams: What are their Characteristics, and Impact on Team Performance?" Computational & Mathematical Organization Theory, vol. 6 Issue 4, pp. 339-360. (Year: 2000).*

* cited by examiner

METHOD AND SYSTEM FOR IMPLEMENTING VIRTUAL USERS FOR AUTOMATED TEST AND RETEST PROCEDURES

CROSS REFERENCE TO RELATED APPLICATION

This application claims priority to Provisional Application No. 61/915,712 filed on Dec. 13, 2013. The contents of this priority application are incorporated herein by reference in its entirety.

This application is related to U.S. patent application Ser. No. 13/605,182, filed on Sep. 6, 2012, now U.S. Pat. No. 8,826,084, issued on Sep. 2, 2014, which claims priority to Provisional Application No. 61/531,769 filed on Sep. 7, 2011; U.S. patent application Ser. No. 13/687,311, filed on Nov. 28, 2012, which claims priority to Provisional Application No. 61/564,009 filed on Nov. 28, 2011 and U.S. patent application Ser. No. 13/718,295, filed on Dec. 18, 2012, which claims priority to Provisional Application No. 61/577,298 filed on Dec. 19, 2011. The contents of these applications are incorporated herein by reference in their entirety.

FIELD OF THE INVENTION

The present invention relates generally to automated test and retest procedures and more specifically to implementing rules-based virtual users.

BACKGROUND OF THE INVENTION

Commercial and military systems today are largely software based and growing in complexity. However, despite advances in development practices and tools, the goals of accelerating the rate at which systems can be delivered and reducing their costs cannot be met by simply writing software faster. Delivering faster, cheaper, and higher quality software will be met with comparable improvements in the practices and tools for automated testing and analysis. Oftentimes, the testing procedures are time-consuming and burdensome. For example, one change for a certain discrete function may affect many other functions of a system, and thereby requiring testing of not just the discrete function but of all the other functions. Thus, considerably time and effort are needed by trained individuals to properly test complex software systems.

The costs of inadequate software testing are staggering. Recent reports estimate the economic costs of faulty software in the U.S. to range in the tens of billions of dollars per year and have been estimated to represent approximately just under 1 percent of the nation's gross domestic product (GDP). Based on the software developer and user surveys, the national annual costs of an inadequate infrastructure for software testing is estimated to range in the billions.

Because software complexity has increased exponentially, manual software testing simply has not kept pace with the software technologies being developed.

Other drawbacks may also be present.

SUMMARY OF THE INVENTION

Accordingly, one aspect of an embodiment of the present invention is to address one or more of the drawbacks set forth above. According to an exemplary embodiment, a system for automated test and retesting using an interactive interface provided by a computer processor comprises: an input configured to receive a set of rules for a virtual user, the set of rules comprising a plurality of conditional statements for the virtual user; a memory component configured to store the set of rules; and a rules engine, comprising at least one processor, configured to generate a plurality of test flows based on the set of rules wherein the test flow tool provides modeling capability through an interface comprising a canvas configured to manage one or more rules and a palette that contains a collection of modeling components; and further configured to automatically execute the plurality of test flows on a system under test.

In other exemplary embodiments, the preceding method may be performed using a system with a processor and a memory comprising computer-readable instructions which when executed by the processor cause the processor to perform the method steps.

According to another embodiment, a computer implemented method for automated test and retesting using an interactive interface provided by a computer processor comprises the steps of: receiving, at an input, a set of rules for a virtual user, the set of rules comprising a plurality of conditional statements for the virtual user; storing, at a memory component, the set of rules; generating, by a rules engine comprising at least one processor, a plurality of test flows based on the set of rules wherein the test flow tool provides modeling capability through an interface comprising a canvas configured to manage one or more rules and a palette that contains a collection of modeling components; and automatically executing, by the rules engine, the plurality of test flows on a system under test.

These and other embodiments and advantages of the invention will become apparent from the following detailed description, taken in conjunction with the accompanying drawings, illustrating by way of example the principles of the various exemplary embodiments.

BRIEF DESCRIPTION OF THE DRAWINGS

In order to facilitate a fuller understanding of the present inventions, reference is now made to the appended drawings. These drawings should not be construed as limiting the present inventions, but are intended to be exemplary only.

DETAILED DESCRIPTION OF EXEMPLARY EMBODIMENT(S)

Figure 1:
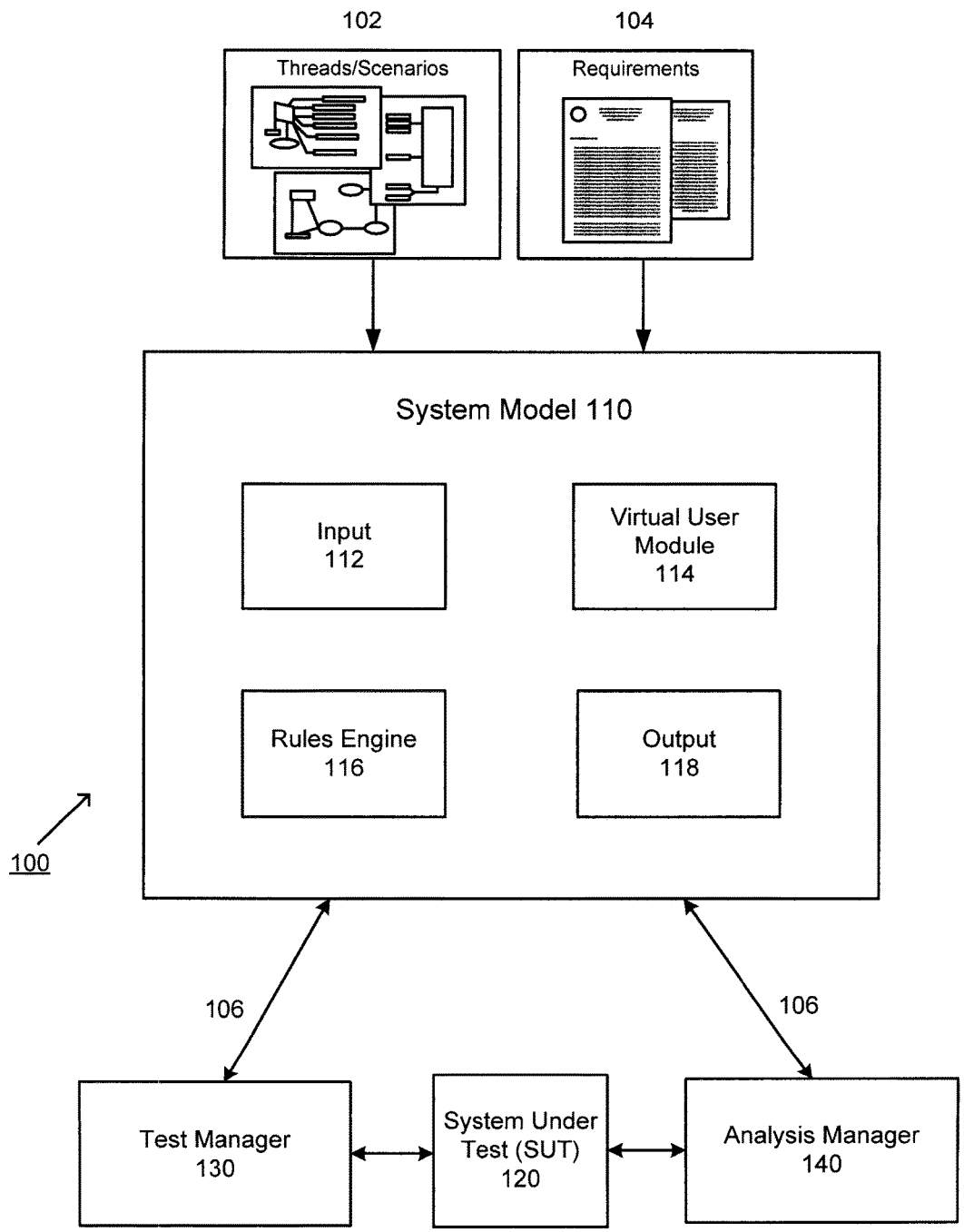
FIG. 1 is an exemplary diagram of a system for automated software testing, according to an embodiment of the present invention.

An automated Graphical User Interface (GUI) test for a software system can be made up of a set GUI interactions laid out in a predefined order which are only valid for the system states and scenarios that they were initially designed for. All possible system states that could be encountered and the order of the execution of these interactions are manually laid out by the user during the test design and can result in highly complex tests.

A set of systems that embody this complexity are distributed multi-user systems. Thorough testing of these systems requires that the system is exercised over extended periods of time with the expected user load. Current testing approaches in this area use human testers to manually interact with the system over the extended periods. The human testers are able to respond correctly in the face of varying system states, vary the order of their system interactions, and use multiple paths to complete the same goal. This results in much higher test coverage than tests which only executes the interaction order and operates on the system states that it was initially created for. The use of humans limits the number and speed of tests that can be executed.

An embodiment of the present invention is directed to a novel method and system that allows a test designer to create a "virtual user(s)" for a specific system through the creation, composition, and automated execution of a set of user defined rules. The virtual users created in this manner may provide complexity management for the test designer creating them and higher test coverage of the System Under Test (SUT) due to their ability to take different paths to reach the same goal.

According to an exemplary application, during a system longevity test, a user may want a tester to perform several functions. In this example, a tester may be needed to monitor a track display and if at any point any non-friendly air track has a speed greater than 1000 mph and a closest point of approach of less than 50 km, then the tester may select the track and mark it for radio interrogation. In a scenario where the range to any of these tracks is less than 10 km, the tester may be needed to mark the track as hostile and start an engagement. Additionally and concurrently, a tester may be required to perform additional tasks, including open the track information display for each track and verify its contents and then change mode to system status and verify sub-systems are operating correctly.

The current state of technology may result in test cases with limitations. For example, such test cases may only be valid for a single scenario it was created for thereby resulting in limited use and flexibility. Another limitation may be that a path that is exercised through the system under test (SUT) would not vary. Also, such test cases may result in very complex tests because a user would need to manage all of the complexities. For example, various constraints and complexities may occur when attempting to continually monitor two items concurrently. In this example, the constraints may be air tracks with a specific speed and air tracks with a specific speed and range. Other constraints may occur when handling concurrency issues with multiple tracks (or events) meeting the criteria for action simultaneously.

According to an embodiment of the present invention, the exemplary scenario provided above would yield a problem broken down into a set of prioritized rules that may be executed automatically by an embodiment of the invention when their respective condition is present on the SUT and it is the highest priority Rule.

For example, an embodiment of the present invention may identify a plurality of rules, e.g., Rule 1, Rule 2, Rule 3 and Rule 4. In this example, Rule 1 may be assigned the highest priority with a statement. The statement may be a conditional statement, such as an "if/then" type statement. The first if/then statement may include: If a non-friendly air track range of less than 10 km, then mark the track as hostile and start an engagement. Rule 2 may be assigned a high priority (lower than the highest priority) with a second if/then statement. The second if/then statement may include: If a non-friendly air track has a speed greater than 1000 kph and a closest point of approach of less than 50 km, then select the track and mark it for radio interrogation. Rule 3 may be assigned a low priority with a third if/then statement. The third if/then statement may include: If all current tracks have been handled, then open the track information display for each track and verify its contents. Rule 4 may be assigned a lowest priority (lower than the low priority) with a fourth if/then statement. The fourth if/then statement may include: If all current tracks have been handled, then change mode to system status and verify all sub systems are operating correctly.

The statements be defined to address various functions and tasks and may vary depending on complexity, application and/or other factors and considerations. For example, a rule may include nested and/or embedded conditions statements, e.g., nested if/then statements. Other examples may include if-then-else statements, else-if statements, optional statements, alternative conditions, equalities, greater than, less than, arithmetic, equations, and/or other variations. Also, a rule may be nested and/or embedded in another rule. Other types of conditions, priorities, rules, steps and/or sequences may be applied. The conditions may also include temporal events, e.g., when an event occurs, at a time period, after an event, before an event, etc. Also, rules may be dependent on multiple conditions, events, factors, etc.

An embodiment of the present invention is directed to reducing the complexity for the test designer by internally monitoring the SUT for the specified conditions and automatically handling the concurrency issues associated with multiple rules through the priority mechanism. In addition, because the order of execution of Rules may be based on the order of the stimulus presented by the SUT, the order of the execution of Rules may therefore be scenario driven and may take different paths through the SUT to reach a goal when different scenarios are presented.

FIG. 1 is an exemplary diagram of a system for model-driven automated software testing, according to an embodiment of the present invention. FIG. 1 illustrates how "virtual users" as represented by 114 in System Model 110 may be applied in various complex automated test environments, according to an exemplary embodiment. For example, in testing typical complex systems, it may be considered important to validate requirements under varying conditions. The virtual user of an embodiment of the present invention allows for variations of operational data sets as well as different mission data sets to be introduced without having to continually update the automated tests. A system 100 of an embodiment of the present invention may include a System Model 110. As illustrated in FIG. 1, system 100 may include user communication devices associated with one or more users accessing the System Model 110 of an embodiment of the present invention. The user may establish a communication session with a communication device via a communication network.

By introducing the virtual users in an automated test environment, an embodiment of the present invention allows the system to be varied by multiple inputs and paths the system can take. This results in more test coverage when combined with other test automation methodologies and products that can validate the accuracy of the system performance.

An embodiment of the present invention is directed to an Automated Test and Re-Test (ATRT) process and suite of technologies to address automated testing of large complex systems and systems-of-systems. A focus of the ATRT system is directed to reducing time and effort involved in conducting system integration and testing while expanding the depth and breadth of test requirement coverage. As a result, projects demonstrate a substantial reduction in test time while expanding test requirement coverage.

An embodiment of the present invention provides users, such as testers, the ability to automate test procedures without having to be software developers themselves. A system of an embodiment of the present invention provides a highly scalable solution that may run 10 or 10000s of tests connecting to any number of displays and servers and further provide automated analysis for 100s of test outcomes or 10000s or more. An embodiment of the present invention can test systems independent of an operating system or a platform and further support various cloud computing and other environments, thereby providing improved customization and configuration. Whether a user needs to write a plug-in to a modeling tool, defect tracking tool or requirements management solution, etc., an embodiment of the present invention may be easily extensible to allow for these additional integration features. Accordingly, any desired tool enhancements and features may be implemented on demand. Moreover, an embodiment of the present invention may be non-intrusive to the System under Test (SUT) in that it reduces or even eliminates modifications to the SUT configuration.

An embodiment of the present invention allows the same or similar test scenarios to run repeatedly with different data sets (e.g., boundary testing, equivalence partitioning, etc.). According to an exemplary application, model driven automated testing allows test flows to be generated via a simple point and click model driven interface solution. An embodiment of the present invention, thus, addresses various complex testing challenges of software systems by providing an innovative technical solution that solves testing problems of complex software systems. For example, testing of a heterogeneous multicomputer environment while providing an integrated solution which includes a tool suite may be achieved and engineering services may be applied across the entire testing lifecycle.

System Model 110 may include various modules and components to perform automated testing with virtual users. System Model 110 may include an Input 112, Virtual User Module 114, Rules Engine 116 and Output 116. While a single illustrative block, module or component is shown, these illustrative blocks, modules or components may be multiplied for various applications or different application environments. In addition, the modules or components may be further combined into a consolidated unit. The modules and/or components may be further duplicated, combined and/or separated across multiple systems at local and/or remote locations. Other architectures may be realized.

System Model 110 may be accessed by a user communication device, such as a computer, a personal computer, a laptop, a cellular communication device, a workstation, a mobile device, a phone, a handheld PC, a personal digital assistant ("PDA"), a thin system, a fat system, a network appliance, an Internet browser, or other any other device that may allow a user to communicate with an application system and the plurality of communication devices (e.g., computer, wireless mobile communication device, etc.) associated with other users via the communication network 106. As shown in FIG. 1, System Model 110 may communicate with Test Manager 130 and Analysis Manager, via communication network 106. Also, System Model 110 may communicate with SUT 120.

A communication network 106 may be coupled to System Model 110 and one or more communication devices (e.g., user communication devices, etc.). SUT 120 may communicate with Test Manager 130 and Analysis Manager 140 via a communication network. The communication network 106 may be a wireless network, a wired network or any combination of wireless network and wired network. For example, the communication network 106 may include one or more of a public switched telephone network (PTSN), a signaling system #7 (SS7) network, a fiber optics network, a passive optical network, a cable network, an Internet network, a satellite network (e.g., operating in Band C, Band Ku or Band Ka), a wireless LAN, a Global System for Mobile Communication ("GSM"), a Personal Communication Service ("PCS"), a Personal Area Network ("PAN"), D-AMPS, Wi-Fi, Fixed Wireless Data, IEEE 802.11a, 802.11b, 802.15.1, 802.11n and 802.11g or any other wired or wireless network for transmitting and receiving a data signal. In addition, the communication network 106 may include, without limitation, telephone line, fiber optics, IEEE Ethernet 802.3, wide area network ("WAN"), local area network ("LAN"), or global network such as the Internet. The communication network 106 may support an Internet network, a wireless communication network, a cellular network, or the like, or any combination thereof. The communication network 106 may further include one, or any number of the exemplary types of networks mentioned above operating as a stand-alone network or in cooperation with each other. The communication network 106 may include a plurality of mobile switching centers (MSCs) and a plurality of signaling control points (SCPs).

The communication network 106 may utilize one or more protocols of one or more network elements to which it is communicatively coupled. The communication network 106 may translate to or from other protocols to one or more protocols of network devices. Although the communication network 106 is depicted as one network, it should be appreciated that according to one or more embodiments, the communication network 106 may comprise a plurality of interconnected networks, such as, for example, a service provider network, the Internet, a broadcaster's network, a cable television network, corporate networks, and home networks.

System Model 110 may access databases and/or other sources of information in accordance with an embodiment of the present invention. The databases may be further combined and/or separated. The databases may reside at a single location or separated through multiple locations. In addition, the databases may be supported by an independent service provider. For example, an independent service provider may support the one or more databases and/or other functionality at a remote location. Other architectures may be realized. The components of the exemplary system diagrams may be duplicated, combined, separated and/or otherwise modified, as desired by various applications of the embodiments of the present invention as well as different environments and platforms.

Data and information may be stored and cataloged in Databases which may comprise or interface with a searchable database. Databases may comprise, include or interface to a relational database. Other databases, such as a query format database, a Standard Query Language (SQL) format database, a storage area network (SAN), or another similar data storage device, query format, platform or resource may be used. Databases may comprise a single database or a collection of databases, dedicated or otherwise. In one embodiment, Databases may store or cooperate with other databases to store the various data and information described herein. In some embodiments, Databases may comprise a file management system, program or application for storing and maintaining data and information used or generated by the various features and functions of the systems and methods described herein. In some embodiments, Databases may store, maintain and permit access to customer information, transaction information, account information, and general information used to process transactions as described herein. In some embodiments, Databases is connected directly to System Model, which, in some embodiments, it is accessible through a network, such as communication network, e.g., 106 illustrated in FIG. 1, for example.

As shown in FIG. 1, Model-Driven Automated Software Testing (AST) technology automates scenario control of a system test (via Test Manager 130) as well as analysis management of the resulting test data (via Analysis Manager 140). A central System Model 110 manages the system test flows, requirements, and analysis behavioral threads (e.g., system Use Cases), when combined define a test procedure. An embodiment of the present invention may be directed to an auto-code generator that leverages the model and automatically generates code that may be compiled into the software suite. Auto-generation allows for rapid development of test cases and utilizes a centralized system engineering architecture.

Exemplary features of the model-driven process may include: robust AST process to address any complex system; full AST solution from scenario control to performance reporting; and AST solution generated from centrally managed model. Using this process, with a non-intrusive integration with the SUT, a user may control an entire test of complex systems as well as perform analysis from one tool.

System requirements, shown by 104, may be received by System Model 110. System requirements may include test procedures, relationships and/or descriptive testing metadata. System Model 110 may then manage various systems requirements, system behaviors, and system tests. According to an exemplary implementation, System Model 110 may include a Systems Modeling Language tool or other modeling language tool, or may even include a home-grown model or other customized model. Regardless, standard system engineering modeling practices may be supported, and system requirements may be read in and linked directly within System Model 110.

System Model 110 may define numerous Industry standard artifacts and/or other artifacts, such as use cases, requirements traceability, activity diagrams, sequence diagrams, verification steps, test procedures and/or other information that encapsulate behaviors of the System Under Test (SUT). An embodiment of the present invention may utilize an approach that incorporates descriptive metadata into the model to facilitate auto-code generator.

Once the system modeling and metadata are complete for a project, Test Flows may be created for Test Manager 130, and Analysis Flows may be created for Analysis Manager 140. According to an embodiment of the present invention, a Test Flow may describe the series of events for controlling and testing the SUT and SUT environment while under test. Analysis Flows may describe detailed verification steps for completing assessment of internal requirements and algorithms of the SUT.

Model-driven automated software testing automates control of a system test via a Test Manager and analysis management of resulting test data via an Analysis Manager. A central System Model manages requirements, use cases and/or other information that encapsulates behaviors of a System Under Test (SUT). An auto-code generator may leverage the System Model and automatically generate code for efficient development of test cases. Once system modeling and metadata are complete, test flows may be created for a Test Manager and analysis flows may be created for an Analysis Manager.

A Test Flow may be a collection of one to many actions arranged to satisfy a specific goal. Test cases, test steps, and functions may each have corresponding Test Flows. Each Test Flow may in turn contain other Test Flows, such as test cases containing test steps, or a test step containing a function. Test Flows may be simple and linear, or may be complex, using conditional constraints or forks and joins to determine behavior.

Test Manager automates large scale system tests through execution of defined Test Flows by providing automated control over system displays and system control messages. The user may execute a predefined Test Flow which comes directly from the System Model, or the user may generate their own Test Flow using a repository of system actions. The Test Manager may then execute the Test Flow on the SUT and report the performance of each step within that flow.

As shown in FIG. 1, Test Manager 130 may be used to automate large scale system tests through execution of defined Test Flows by providing automated control over system displays and system control messages. Some of the displays and messages drive system simulators or system consoles that may be used for full closed-loop testing. A user may manage a Test Flow within the Test Manager. For example, the user may execute a predefined Test Flow which comes from the System Model, or the user may generate their own Test Flow using a repository of system actions. The Test Manager may then execute the Test Flow on the SUT and report the performance of each step within that flow.

Analysis Manager may perform various functions, such as extract, map, and link the fundamental data for testing from the SUT recorded raw data. Analysis Manager may then assess the data against Analysis Flows generated from the System model. System performance may be analyzed when the SUT data is executed through the verification and requirement steps defined in the Analysis Flows. Analysis Manager may then output a series of integrated reports and plots. An embodiment of the present invention recognizes that with the increase of test coverage comes an increase of test results that needs to be analyzed. Thus, an automated reporting capability on the increased test coverage and outcome, comparing expected versus actual results may be provided.

As shown in FIG. 1, Analysis Manager 140 may automate data analysis, performance assessment, and expand test coverage for lower-level software and algorithm requirements levied within the SUT. Analysis Manager 140 may perform various functions, such as extract, map, and link the fundamental data for testing from the SUT recorded raw data. Typically, raw data sets from multi-day test events may be enormous in size and often contain windows of erroneous data caused by software and hardware failures during test time. Isolating and organizing the data allows for timely evaluation and analysis. Analysis Manager 140 may then assess the data against Analysis Flows generated from the System model. System performance may be analyzed when the SUT data is executed through the verification and requirement steps defined in the Analysis Flows. Also, Analysis Manager 140 may receive use cases, scenarios and/or other data from System Model 110. Analysis Manager 140 may then output a series of integrated reports and plots. These reports may include requirements, pass/fail reports, verification methods for each requirement within the reports, system performance analysis results, and plots which characterize the events.

Test Manager 130 may provide automated control over system displays and system control messages while the system is under test. Some of the displays and messages may drive system simulators or system consoles for full closed-loop testing. Test Manager 130 may record Test Flows and playback back graphically at a later time. This may include capturing and analyzing send/receive messages that drive the SUT and SUT stimulus. The capture and playback functionality may be used when conducting interface testing within a system, or interoperability tests between multiple systems. For example, messages may be recorded and processed through Test Manager 130 during the test to record and analyze the messages before a different subscriber system receives the messages. Messages may include sending and receiving scenario control messages; simulation control messages; heartbeat/health messages, for example.

An embodiment of the present invention may combine Graphical User Interface (GUI) and non-GUI automated testing. GUI and message based testing capability for Systems Under Test (SUTs) may be provided when GUIs are unavailable or when GUI test automation is not beneficial, and Message Based testing is a viable solution. Also, GUI based automated testing may be enhanced with Message Based testing. Messages may include any message in any form that is sent from one device to another device through a network connection. Messages may include text, images, audio, video and/or other form of data, as well as various combinations thereof. Distributed testing over a network may involve automated tests executed over a network. For an exemplary test case, various GUI or message based outputs may be dependent on each other over a network. An example may involve: GUI output 1 is a prerequisite to GUI output 2, or to test other serial or parallel message or GUI based interactions. Concurrent testing support may be provided, for the test case where various test scenarios may run in parallel and race-conditions and other concurrency issues have to be detected, and simulation of live SUT interaction may be required. A batch processing feature may be provided for the case when various test cases may be executed together as a batch job as part of endurance or longevity testing.

An embodiment of the present invention provides scriptless automated testing. For example, software testing code may be automatically generated for the tester through simple point and click features. With a "capture playback" feature, a baseline test code may be generated behind the scenes and may then be re-used for regression testing for each subsequent SUT release. Keyword driven automated testing may reduce test creation time significantly, and may further enable the tester to generate automated test code via simple clicks of test related test "action" icons as part of a test scenario. Code may be generated behind the scene and may be automatically added to the automated test baseline. Input test data may be grouped into boundaries: e.g., valid, invalid, boundary, one off boundary and so forth. An embodiment of the present invention recognizes that most defects congregate around boundary values of data input. Thus, a manual testing challenge is that there is often not enough time to cover the boundaries or equivalence classes of test data input combinations. With data driven testing feature of an embodiment of the present invention, one test scenario may be reused over and over with different data values and data combinations. The model-driven automated testing capability of an embodiment of the present invention allows complex test flows (e.g., loops, conditionals, etc.) to be designed via a model driven interface via simple point/click/drag, e.g., test creation and execution via a workflow/flowchart user interface.

Figure 2:
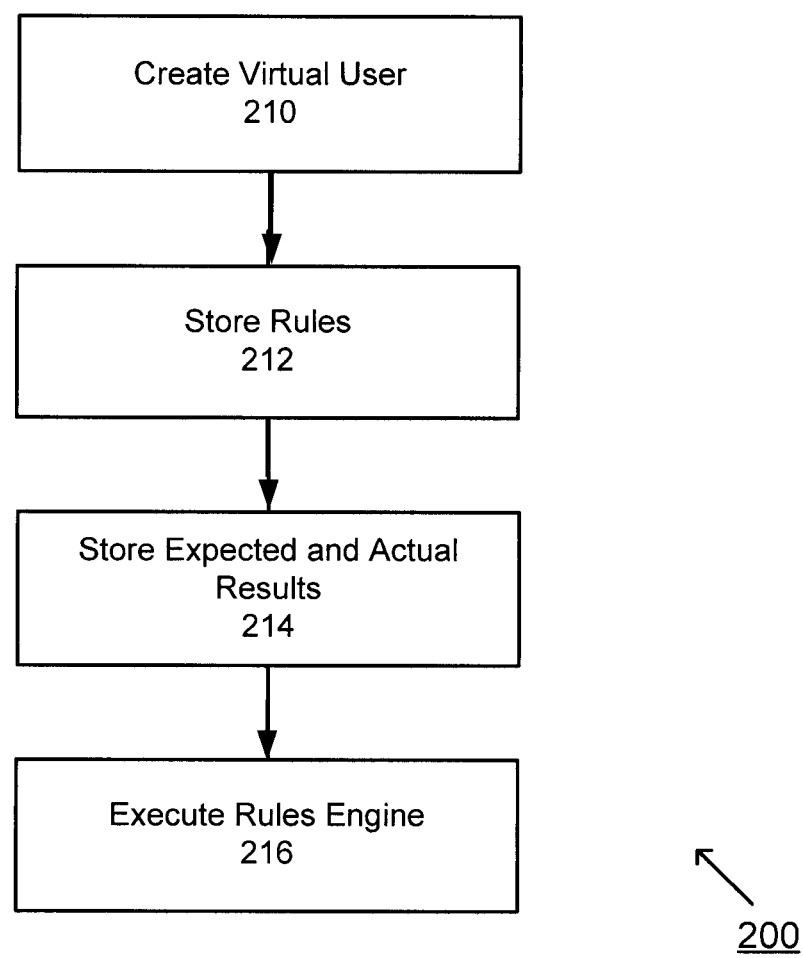
FIG. 2 is an exemplary flowchart illustrating virtual user implementation, according to an embodiment of the present invention.

FIG. 2 is an exemplary flowchart illustrating virtual user implementation, according to an embodiment of the present invention. At step 210, a virtual user may be created. At step 212, rules may be stored. At step 214, results may be stored. At step 216, the rules may be applied to a rules engine. The order illustrated in FIG. 2 is merely exemplary. While the process of FIG. 2 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 210, a virtual user may be created by an embodiment of the present invention. The virtual user may be defined by a series of statements, which may include conditional statements, e.g., if/then statements, etc. Other variations and combinations of statements may be applied depending on the application, complexities and preferences. For example, a virtual user template may be applied for various types of users. A base level user may have a corresponding template with predefined rules that may be applied as default and/or with some variation. The base level user template may be specific to a particular program or system. Another type of user may be an intermediate tester with another set of predefined rules that may be applied as default and/or with some variation. Other modifications may be applied in varying degrees of granularity. Additional user types may be defined. Also, a user may select from a category of users, the categories may be further refined and/or based on specific to tasks, results, uses, applications, etc. For other scenarios with specific tasks, a user may define a set of rules for a virtual user from scratch. According to another example, a user may provide an input (e.g., goal, result, etc.) and an embodiment of the present invention may recommend a set of rules to be applied. Other variations may be realized.

At steps 212 and 214, rules and results may be stored. These steps may occur separately or they may be combined as a single step. Each virtual user or group of users may be associated with one or more rules. In addition, the rules may be prioritized, for example. A hierarchy, sequence, preference, etc. may be applied to the rules. The results of the rules applications may also be stored in a storage device, such as one or more databases.

At step 216, the rules may be applied to a rules engine. For example, the rules may be sent or communicated to a Rules Engine. The Rules Engine may be integral with the system or separate. The Rules Engine may apply the rules and the actual results may be stored at step 212. The actual results may be compared to the expected rules and used to refine the rules. An embodiment of the present invention provides the ability to refine and further learn from the actual results. For example, rules may be revised and/or modified in response to the actual results and/or other factor or input.

Figure 3:
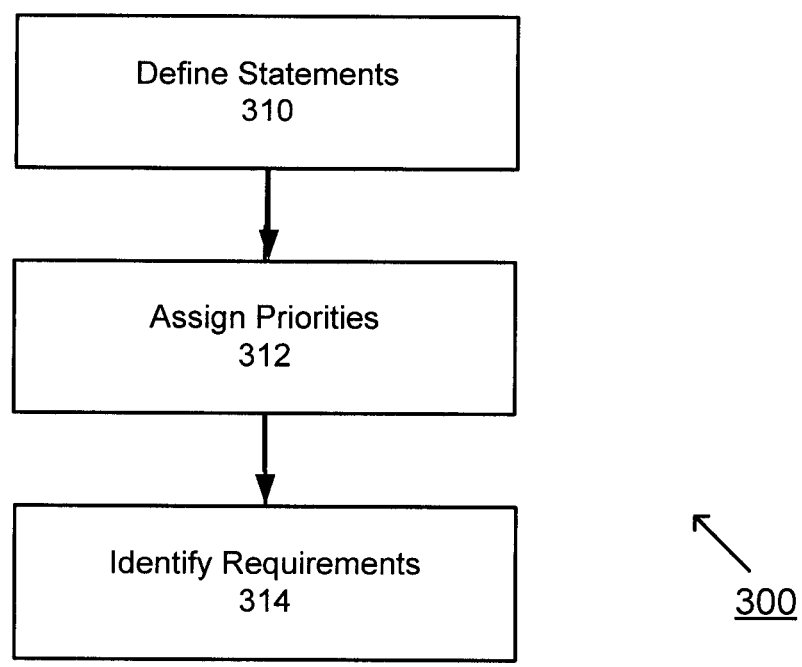
FIG. 3 is an exemplary flowchart illustrating creating a virtual user, according to an embodiment of the present invention.

FIG. 3 is an exemplary flowchart illustrating creating a virtual user, according to an embodiment of the present invention. At step 310, statements may be defined. At step 312, priorities may be assigned. At step 314, requirements may be identified. The order illustrated in FIG. 3 is merely exemplary. While the process of FIG. 3 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 310, statements may be defined. For each virtual user, one or more statements may be defined. The statements may be defined for a virtual user, group of users, type of user, etc. The statements may include an algorithm, conditional statement, such as if/then statements and user tasks. For example, user task statements may include search for, select all, find, start, stop, delete, etc.

At step 312, priorities may be assigned. Each virtual user may have a series of conditional statements, which may include if/then statements. For example, if more than one if/then statement is defined, one or more priorities may be applied. Default priorities may be applied. Also, for a particular task or category, a predefined logic may be applied to assign priorities.

At step 314, requirements may be identified. In this example, an embodiment of the present invention may identify requirements to be tested and corresponding expected results. For example, if a particular icon is red (or other color, symbol, etc.), one or more system alerts may be updated. Also, a system may identify events, e.g., hostile tracks, with a symbol (e.g., symbol H), and other events, e.g., friendly tracks, with another symbol (e.g., symbol F). A system may respond within a time period (e.g., 10 seconds, or other event, trigger, etc.) of receiving a high priority message, for example.

Figure 4:
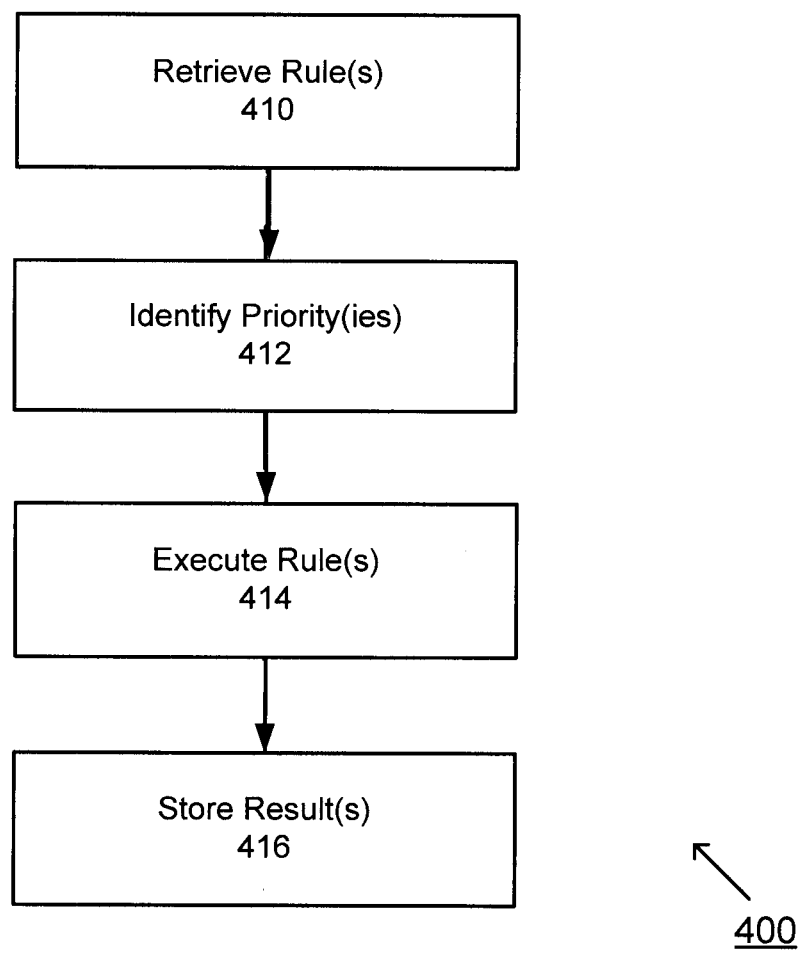
FIG. 4 is an exemplary flowchart illustrating executing rules to implement a virtual user, according to an embodiment of the present invention.

FIG. 4 is an exemplary flowchart illustrating executing rules to implement a virtual user, according to an embodiment of the present invention. At step 410, one or more rules may be retrieved. At step 412, priorities may be identified. At step 414, the rules may be executed. At step 416, the results may be stored. The order illustrated in FIG. 4 is merely exemplary. While the process of FIG. 4 illustrates certain steps performed in a particular order, it should be understood that the embodiments of the present invention may be practiced by adding one or more steps to the processes, omitting steps within the processes and/or altering the order in which one or more steps are performed. These steps will be described in greater detail below.

At step 410, one or more rules may be retrieved. The rules may be accessed or otherwise identified. The rules may be retrieved from a Rules Engine. The rules may also be supplied by an input, an external source, program, etc. The rules may be automated and/or defined by an input.

At step 412, priorities may be identified. Priorities may be defined for each statement. Priorities may indicate a progression of steps and a corresponding logical order to be applied to the steps.

At step 414, the rules may be executed. For example, one or more rules may be executed against the SUT based on one or more priorities.

At step 416, the results may be stored. The results may be received and stored at Rules Engine. Also, the results may be forwarded elsewhere. Reports, graphics and/or other output may be provided in response to the results. The reports may track historical data and provide reports based various metrics, filters, preferences, etc.

Figure 5:
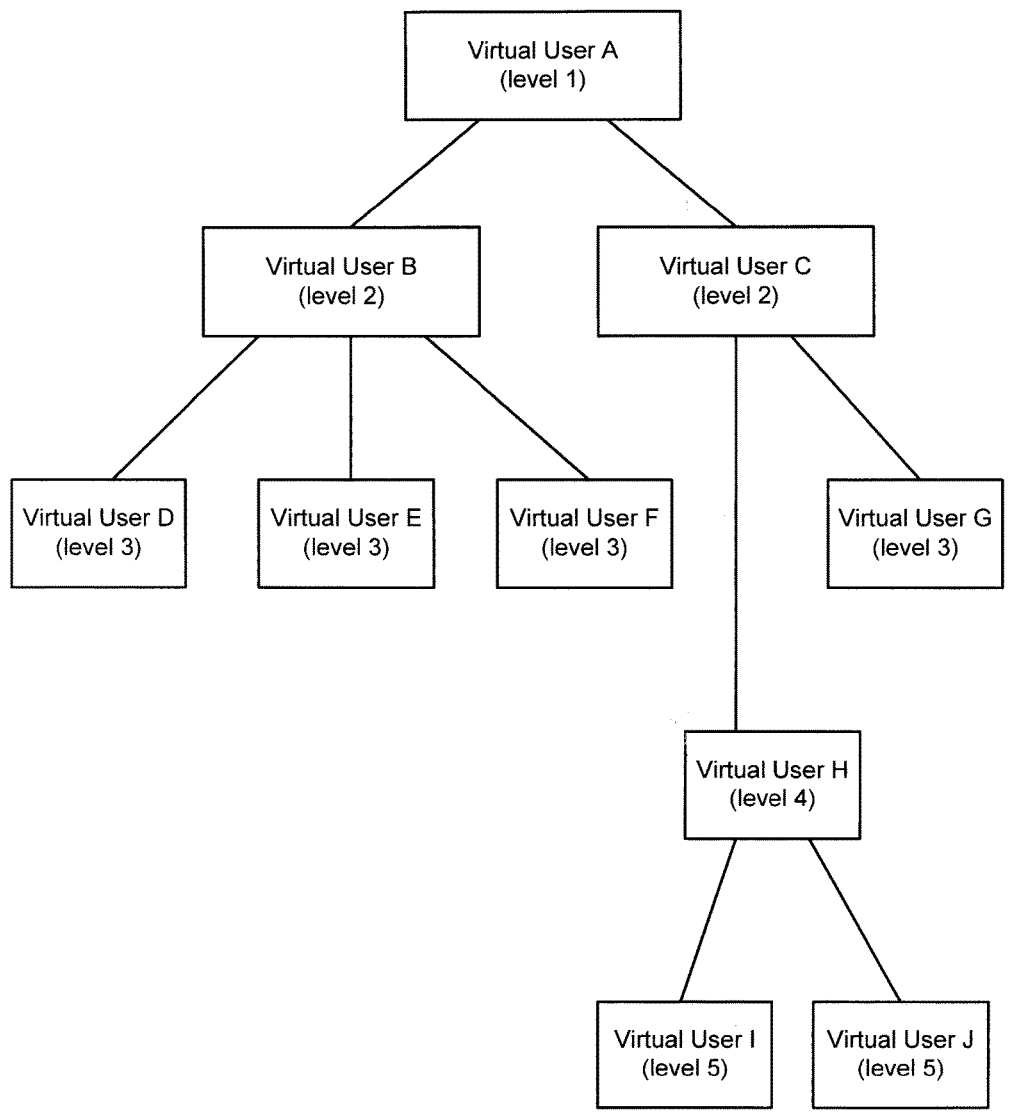
FIG. 5 is an exemplary diagram illustrating a plurality of virtual users, according to an embodiment of the present invention.

FIG. 5 is an exemplary diagram illustrating a plurality of virtual users, according to an embodiment of the present invention. According to another example, virtual users may form a virtual team where the virtual team may include multiple levels of command or authority. For example, a virtual team may include a virtual leader in charge of multiple virtual supervisors where each virtual supervisor manages a team of virtual users. Actions of one virtual user may be dependent on actions or results from one or more other virtual users and/or events or other occurrences. In this example shown in FIG. 5, Virtual User A is given a level 1. In this example, level 1 is the highest level of command. Under Virtual User A's immediate command are two virtual users, Virtual User B and Virtual User C. Each of these users has their own group of virtual users. Virtual User B has three users all at the same level, level 3. Virtual User C has a group with Virtual User G of level 3 and additional virtual users of lower levels, level 4 and level 5. Other variations of levels of commands and variations in hierarchy may be implemented.

Figure 6:
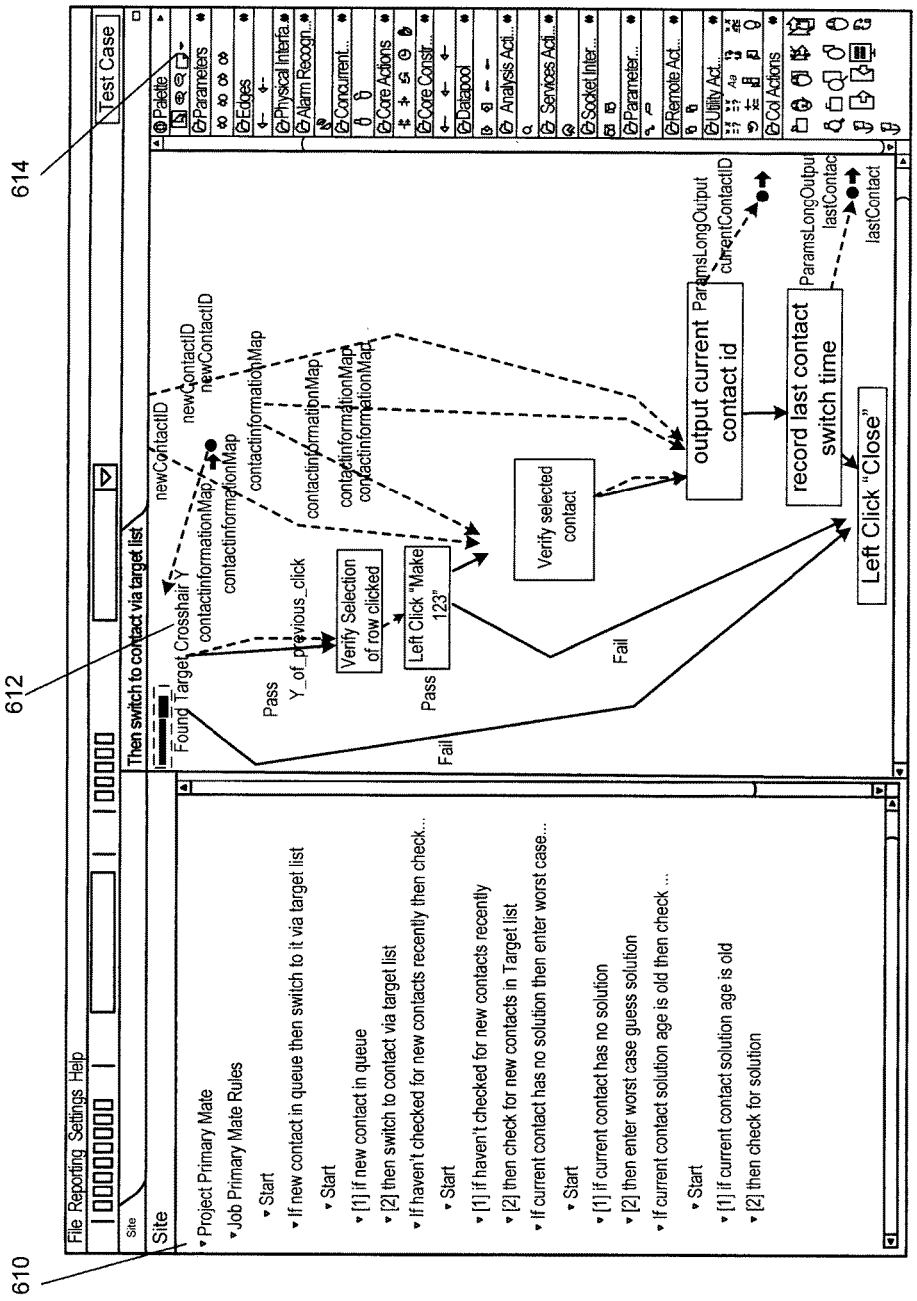
FIG. 6 is an exemplary illustration of a canvas provided by Test Manager, according to an embodiment of the present invention.

FIG. 6 is an exemplary illustration of a canvas provided by Test Manager, according to an embodiment of the present invention. A canvas provides a user interface for building test flows. Interface 600 may include several panels, including Panel 610 which provides rules for a virtual user. Canvas 612 illustrates test flows, which may include a collection of test steps or actions corresponding to the rules. Panel 614 provides various actions, including concurrent actions, core actions, core constraints, data pool, GUI actions, analysis actions, socket interfaces, parameter passing actions, utility actions, etc. Also, functions and edges that indicate the order of test execution may be specified.

As shown in FIG. 6, Panel 610 may contain rules for a particular virtual user, or group of users. In this example, the virtual user is a primary mate. Example rules shown in 610 may include "[1] if new contact in queue; [2] then switch to contact via target list;" "[1] if haven't checked for new contact recently, [2] then check for new contacts in Target list;" "[1] if current contact has no solution, [2] then enter worst case guess solution;" "[1] if current contact solution age is old; [2] then check for solution;" "[1] if haven't changed contacts recently, [2] then switch to contact with oldest solution via arrows;" and "[1] if nothing else to do, [2] then mouse over bottom displays." Also, a conditional statement may be preceded by another condition or statement. An embodiment of the present invention may also include definitions for events, terms and/or other factor identified in the rules. The definitions may also change based on events, conditions and/or factors. Corresponding flow modeling is then shown on Canvas 612.

An embodiment of the present invention enables users to create "virtual users" such as primary mate, control officer and launch officer, for example. A rules engine of an embodiment of the present invention may execute virtual user rules as defined by the user. For example, one or more virtual users may act as system operators and run continuously based on rules defined by the creator. Priority based rule scheme provides the ability of virtual users to execute high priority tasks first, then lower priority tasks in descending order of priority. Rules with same priorities may be executed randomly to begin to provide randomness into the tests. Other schemes may be applied as well.

A virtual user may also include a learning algorithm (or artificial intelligence) to emulate the actions of an actual user with a particular technical background and/or experience level.

According to an embodiment of the invention, the systems and processes described in this invention may be implemented on any general or special purpose computational device, either as a standalone application or applications, or even across several general or special purpose computational devices connected over a network and as a group operating in a client-server mode. According to another embodiment of the invention, a computer-usable and writeable medium having a plurality of computer readable program code stored therein may be provided for practicing the process of the present invention. The process and system of the present invention may be implemented within a variety of operating systems, such as a Windows® operating system, various versions of a Unix-based operating system (e.g., a Hewlett Packard, a Red Hat, or a Linux version of a Unix-based operating system), or various versions of an operating system. For example, the computer-usable and writeable medium may be comprised of a CD ROM, a floppy disk, a hard disk, or any other computer-usable medium. One or more of the components of the system or systems embodying the present invention may comprise computer readable program code in the form of functional instructions stored in the computer-usable medium such that when the computer-usable medium is installed on the system or systems, those components cause the system to perform the functions described. The computer readable program code for the present invention may also be bundled with other computer readable program software. Also, only some of the components may be provided in computer-readable code.

Additionally, various entities and combinations of entities may employ a computer to implement the components performing the above-described functions. According to an embodiment of the invention, the computer may be a standard computer comprising an input device, an output device, a processor device, and a data storage device. According to other embodiments of the invention, various components may be computers in different departments within the same corporation or entity. Other computer configurations may also be used. According to another embodiment of the invention, various components may be separate entities such as corporations or limited liability companies. Other embodiments, in compliance with applicable laws and regulations, may also be used.

The description above describes communication devices, an application system, a communication network having network elements, storage devices, various networks, and other elements for coupling user via the communication network, some of which are explicitly depicted, others of which are not. As used herein, the term "module" may be understood to refer to computer executable software, firmware, hardware, or various combinations thereof. It is noted that the modules are exemplary. The modules may be combined, integrated, separated, or duplicated to support various applications. Also, a function described herein as being performed at a particular module may be performed at one or more other modules and by one or more other devices instead of or in addition to the function performed at the particular module. Further, the modules may be implemented across multiple devices or other components local or remote to one another. Additionally, the modules may be moved from one device and added to another device, or may be included in both devices.

It is further noted that the software described herein may be tangibly embodied in one or more physical media, such as, but not limited to, a compact disc (CD), a digital versatile disc (DVD), a floppy disk, a hard drive, read only memory (ROM), random access memory (RAM), as well as other physical media capable of storing software, or combinations thereof. Moreover, the figures illustrate various components (e.g., servers, computers, etc.) separately. The functions described as being performed at various components may be performed at other components, and the various components may be combined or separated. Other modifications also may be made.

Other embodiments, uses and advantages of the present invention will be apparent to those skilled in the art from consideration of the specification and practice of the invention disclosed herein. The specification and examples should be considered exemplary only. The intended scope of the invention is only limited by the claims appended hereto.

The invention claimed is:

1. A computer implemented system for automated test and retesting using an interactive interface provided by a computer processor, the system comprising:
    an input configured to receive a set of rules executed by a virtual user of a plurality of virtual users, the set of rules comprising a plurality of conditional statements for the virtual user and the set of rules defines a type of virtual user from a plurality of types of virtual users, the virtual user represents an emulation of an operator, having one or more duties, that interacts with a system under test in a specific manner as defined by the set of rules and the plurality of virtual users allow for variations of datasets and further supports multiple inputs and multiple paths that a system under test can take to reach a single goal when different scenarios are presented so that the inputs and outputs are not predefined;
    a memory component configured to store the set of rules; and
    a rules engine, comprising at least one processor, configured to generate a plurality of test flows based on the set of rules wherein a test flow tool provides modeling capability through an interface comprising a canvas configured to manage one or more rules and a palette that contains a collection of modeling components, the plurality of test flows represents a specific set of operations available to a specific virtual user and further defines how the specific virtual user interacts with the system under test; and further configured to automatically execute the plurality of test flows on the system under test, each test flow comprises a collection of one or more computer-based actions arranged to satisfy a specific test goal as performed by a specific virtual user based on the one or more duties associated with the emulated operator;
    wherein the set of rules further comprises a plurality of priority settings for the set of rules associated with each virtual user of the plurality of virtual users, wherein each rule of the set of rules has a corresponding priority rule that defines an execution order sequence that automatically proceeds along a path that a specific virtual user takes in interacting with the system under test from a plurality of possible paths based on an order of stimulus presented by the system under test, where the stimulus is not predefined.

2. The system of claim 1, wherein the plurality of virtual users comprises a virtual team that is managed by a virtual supervisor where the virtual team is defined according to a command hierarchy.

3. The system of claim 1, wherein the memory is further configured to store expected results and actual results responsive to the rules engine execution.

4. The system of claim 1, wherein the input is further configured to receive one or more system requirements and one or more model artifacts; wherein a test case builder further automatically generates code for a test case based on the one or more system requirements and the one or more model artifacts.

5. The system of claim 4, further comprising:
an analysis manager, comprising at least one processor, configured to receive output data from the system under test and generate one or more outputs based on the output data.

6. The system of claim 5, wherein the one or more outputs comprise one or more of analysis reports and analysis plots.

7. The system of claim 4, wherein the one or more system requirements comprise one or more of: test procedures and descriptive testing metadata.

8. The system of claim 4, wherein the one or more model artifacts comprise one or more of: use cases, activity diagrams, sequence diagrams and behaviors of the system under test.

9. The system of claim 1, wherein the at least one test flow is graphically created or modified by a user, without using scripts.

10. A computer implemented method for automated test and retesting using an interactive interface provided by a computer processor, the method comprising the steps of:
receiving, at an input, a set of rules executed by a virtual user of a plurality of virtual users, the set of rules comprising a plurality of conditional statements for the virtual user and the set of rules defines a type of virtual user from a plurality of types of virtual users, the virtual user represents an emulation of an operator, having one or more duties, that interacts with a system under test in a specific manner as defined by the set of rules and the plurality of virtual users allow for variations of datasets and further supports multiple inputs and multiple paths that a system under test can take to reach a single goal when different scenarios are presented so that the inputs and outputs are not predefined;
storing, at a memory component, the set of rules;
generating, by a rules engine comprising at least one processor, a plurality of test flows based on the set of rules wherein a test flow tool provides modeling capability through an interface comprising a canvas configured to manage one or more rules and a palette that contains a collection of modeling components, the plurality of test flows represents a specific set of operations available to a specific virtual user and further defines how the specific virtual user interacts with the system under test; and
automatically executing, by the rules engine, the plurality of test flows on a system under test, each test flow comprises a collection of one or more computer-based actions arranged to satisfy a specific test goal as performed by a specific virtual user based on the one or more duties associated with the emulated operator;
wherein the set of rules further comprises a plurality of priority settings for the set of rules associated with each virtual user of the plurality of virtual users, wherein each rule of the set of rules has a corresponding priority rule that defines an execution order sequence that automatically proceeds along a path that a specific virtual user takes in interacting with the system under test from a plurality of possible paths based on an order of stimulus presented by the system under test, where the stimulus is not predefined.

11. The method of claim 10, wherein the plurality of virtual users comprises a virtual team that is managed by a virtual supervisor where the virtual team is defined according to a command hierarchy.

12. The method of claim 10, wherein the memory is further configured to store expected results and actual results responsive to the rules engine execution.

13. The method of claim 10, further comprising the steps of:
receiving one or more system requirements and one or more model artifacts; wherein a test case builder further automatically generates code for a test case based on the one or more system requirements and the one or more model artifacts.

14. The method of claim 13, further comprising the step of:
sending, to an analysis manager, output data from the system under test and generating one or more outputs based on the output data.

15. The method of claim 14, wherein the one or more outputs comprise one or more of analysis reports and analysis plots.

16. The method of claim 13, wherein the one or more system requirements comprise one or more of: test procedures and descriptive testing metadata.

17. The method of claim 13, wherein the one or more model artifacts comprise one or more of: use cases, activity diagrams, sequence diagrams and behaviors of the system under test.

18. The method of claim 10, wherein the at least one test flow is graphically created or modified by a user, without using scripts.

* * * * *